Figure 1:
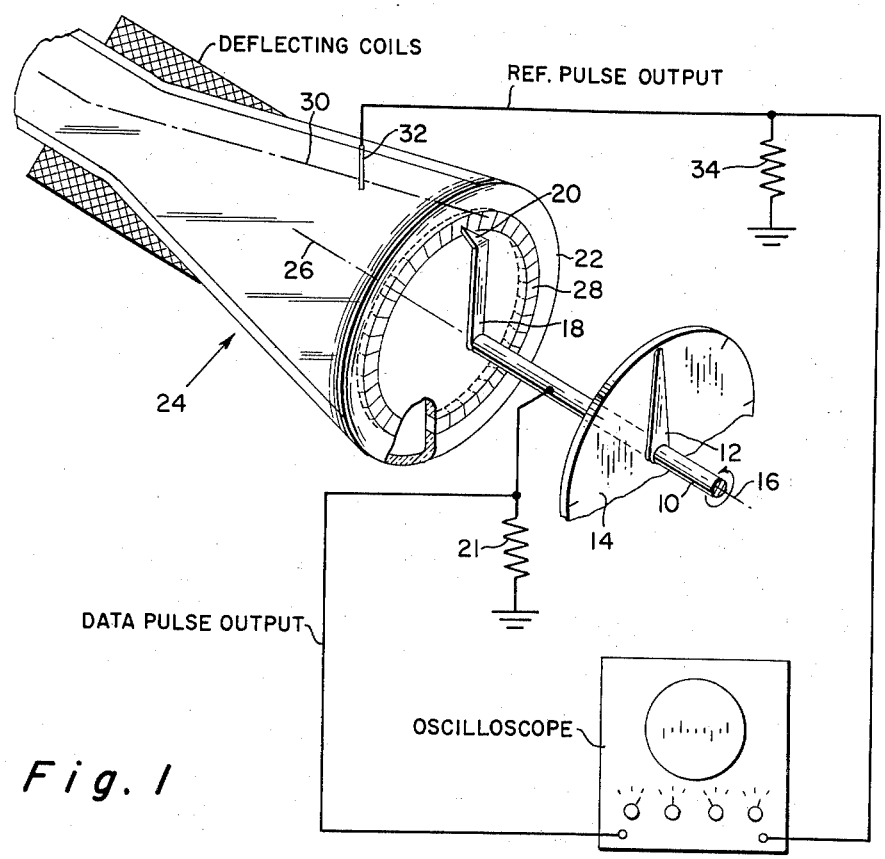

Jan. 17, 1961   F. A. GUERTH   2,968,800
SHAFT POSITION INDICATOR
Filed Oct. 19, 1959

INVENTOR.
FRITZ A. GUERTH
ATTORNEYS

United States Patent Office 2,968,800
Patented Jan. 17, 1961

2,968,800

SHAFT POSITION INDICATOR

Fritz A. Guerth, 50 Lori Road, Camarillo, Calif.

Filed Oct. 19, 1959, Ser. No. 847,439

6 Claims. (Cl. 340—203)

(Granted under Title 35, U.S. Code (1952), sec. 266)

The invention described herein may be manufactured and used by or for the Government of the United States of America for governmental purposes without the payment of any royalties thereon or therefor.

The present invention relates to means for indicating the instantaneous angular position of a shaft which is subject to relatively slow rotation about its axis, such, for example, as the output shaft of a temperature-measuring instrument. The invention is also useful in yielding information regarding some aspect of the operation of a mechanism in cases where the condition can be represented by the instantaneous angular position of some rotatable component thereof.

While it is customary in numerous environments to employ indicators, such as meters, to visually check the condition of some portion of a system or machine, it is frequently desirable to convert this visual information into an electrical potential so that it may be utilized to regulate other apparatus the operation of which is a function of the status of the component producing the voltage. Indicators now employed for this purpose, such as potentiometers the moving element of which is actuated by the meter shaft or by some other rotatable member the position of which it is desired to ascertain, lack the high degree of accuracy required to represent the precise operating conditions of such extremely complex assemblies as are now incorporated, for example, in supersonic aircraft or in guided missiles and rockets. Then, too, it is becoming increasingly advantageous to electronically record the derived information for subsequent inspection and evaluation, as in cases where it is desired to determine the reason for some malfunctioning of a control system, or the cause of failure of a carefully-prepared operation such as a missile launching. The extremely short interval of time within which such an action ordinarily occurs renders impractical the use of any means for visually depicting this data by meters or other indicators which yield no permanent record of the intelligence so obtained. Still further, when this data is telemetered to a remote location, it is frequently multiplexed with other signals in order to conserve bandwidth, and it is highly desirable that it be in a form which is readily adaptable to this type of transmission.

In a copending U.S. patent application of the present applicant, Serial No. 847,438, filed concurrently herewith, there is set forth the concept of translating the instantaneous angular position of a shaft into an electrical pulse the time position of which can be compared to that of a reference pulse indicative of zero degrees of shaft rotation. The time spacing between the pulses is thus representative of the amount of angular rotation of the shaft at the instant of pulse production, or, in other words, the number of degrees of shaft departure from zero position. This is brought about, in a preferred embodiment of the invention set forth in this copending application, by utilizing a member about which there is produced a field of force. This force-producing member is coaxially arranged with respect to a shaft the instantaneous angular position of which it is desired to ascertain. The force-producing member is then rotated so that during each rotational cycle two pulses are produced, one of which is representative of the instantaneous angular shaft position and the other of which is a reference pulse indicative of zero degrees of shaft rotation.

The concept set forth in the above-referred-to copending application Serial No. 847,438 is extremely advantageous in yielding shaft position data of high accuracy and in a form which is readily utilizable. However, it requires the employment of a second shaft which rotates coaxially with the shaft the position of which it is desired to ascertain. In certain cases, such a mechanical arrangement may not be feasible. This could be true, for example, when the output shaft is relatively inaccessible, or in situations where space limitations preclude the adding of any further moving components to the basic assembly. In such instances, it may be preferable to obtain the same information by means which are solely or principally electronic in nature—that is, by an arrangement which does not require the presence of a second rotatable shaft or the driving force for producing a relatively constant rotation thereof.

In accordance with a preferred embodiment of the present invention, the rotatable force-producing member of application Serial No. 847,438 is in effect replaced by the electron beam of a cathode-ray tube. This tube is designed with an annular electrode on the face thereof, such electrode being made up of a number of conductive segments which are electrically insulated from one another and which extend completely through the glass face plate of the tube. These segments define a ring the center of which lies not only on the longitudinal axis of the cathode ray tube, but also on the axis of rotation of the shaft the instantaneous angular position of which it is desired to ascertain. The beam of the cathode-ray tube is caused to produce a circular scan around the inner surface of the ring-shaped electrode, and an arm on the data shaft carries a wiper which is adapted for a similar circular rotation around the outer surface of the same electrode. The device is so arranged that, when the circularly-scanning electron beam impinges that particular conductive segment of the annular electrode on which the shaft wiper element is resting at a given instant of time, an output pulse is generated. A reference pulse is produced by the impingement of the scanning beam on a needle-shaped radial electrode within the cathode-ray tube, and the time displacement between these pulses is indicative of the instantaneous shaft position in a manner similar to that described in application Serial No. 847,438. The derived data may be displayed visually or recorded in any conventional manner.

One object of the present invention, therefore, is to provide an improved means for indicating the instantaneous angular position of a member which is adapted for relatively slow rotation about an axis.

Another object of the invention is to provide means for producing a first series of pulses indicative of the instantaneous angular position of a rotatable member, producing a second series of pulses indicative of an established reference position, and then measuring the time displacement between corresponding pulses of the two series to determine the angular displacement of the rotatable member from the reference position.

A further object of the invention, in a preferred embodiment, is to provide a cathode-ray tube coaxially arranged with respect to a shaft the instantaneous angular position of which it is desired to determine, such cathode-ray tube being designed with an annular electrode on the face thereof which is separated into electrically-independent segments extending through the tube wall, rotating the electron beam of the cathode-ray tube to scan such annular electrode, and then providing the data shaft with a wiper arm arranged to contact at any particular instant of time the exterior surface of one only of the electrically-independent electrode segments.

Figure 2:
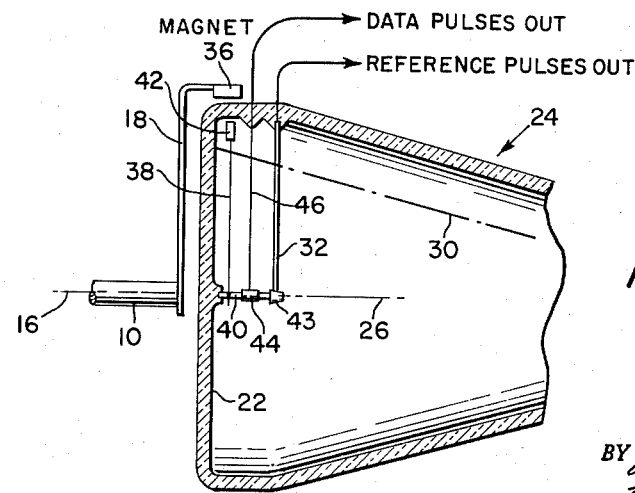

Other objects and many of the attendant advantages of this invention will be readily appreciated as the same becomes better understood by reference to the following detailed description when considered in connection with the accompanying drawings, wherein:

Fig. 1 is a partly schematic representation of a shaft position indicator designed in accordance with a preferred embodiment of the present invention; and Fig. 2 is a partly schematic representation of a further embodiment of the present invention.

Referring first to Fig. 1 of the drawings, there is illustrated a rotatable shaft 10 the instantaneous angular position of which it is desired to determine. Shaft 10 may, for example, form part of a temperature-measuring instrument or meter which includes the pointer 12 and dial 14, or it may be a slowly-rotating component of some machine or mechanism the operation of which is in some way related to, or associated with, the angular position of the shaft at a given instant of time. Shaft 10, which rotates about an axis 16, is provided with a radially-extending arm 18 on the end of which is carried a wiper contact element 20. Arm 18, and at least a portion of shaft 10, are preferably formed of electrically-conductive material, so that wiper element 20 may be connected to ground through a resistor 21 as indicated in the drawing. However, other methods of maintaining the wiper arm 18 at the proper D.-C. potential are possible and may if desired be substituted for the particular arrangement shown.

Positioned so that the face plate 22 thereof has its outer surface in proximity to or contacted by the wiper element 20 is a cathode-ray tube 24 disposed in such fashion that the longitudinal axis 26 of the tube constitutes in effect an extension of the shaft axis 16. Face plate 22 has embedded therein a plurality of electrically-independent electrode segments 28 which define a ring concentric with the tube axis 26. Each electrode segment 28 extends completely through the tube wall so as to possess both an inner and an outer conductive surface. The radius of arm 18 is generally the same as that of the ring defined by the electrode segments, so that, as the angular position of shaft 10 changes, the wiper element 20 contacts, or establishes a capacitive relationship with, a different electrode segment from the one contacted prior to such a change in shaft orientation. Furthermore, since each of the segments 28 is electrically independent, only that particular segment contacted by wiper element 20 is grounded at any one instant of time through the resistor 21.

The cathode-ray tube 24 is provided in the usual fashion with an electrode gun (not shown) for developing a cathode-ray scanning beam 30, this electrode gun being maintained at a potential which is rather highly negative so as to establish an accelerating force for the beam. Tube 24 is also equipped with means (likewise not shown) for deflecting the beam 30 so as to produce a circular scan, the radius of this circular scan being such that the beam successively impinges the respective inner surfaces of the electrode segments 28 during each scanning cycle. Deflecting systems capable of generating such a circular scan are well known in the art, and it would serve no useful purpose to describe such a system in detail in the present application.

It will now be understood that the wiper element 20 contacts only one of the electrode segments 28 at any instant of time, the particular segment contacted being dependent on the angular position of shaft 10. The circularly-scanning cathode-ray beam 30, in passing over the inner surface of the particular electrode segment on which the wiper element 20 is resting, develops a pulse of energy across resistor 21, and this energy pulse is directly related to the instantaneous angular shaft position. To provide a time base, or reference, for the pulses thus cyclically developed across resistor 21, a fixed radial electrode 32 is located within the cathode-ray tube and extends through the side wall thereof as illustrated. Electrons in the scanning beam, impinging this fixed electrode 32, develop a voltage variation across an output resistor 34, and thus two voltage waves are produced the time displacement of corresponding portions of which is representative of the instantaneous angular position of shaft 10.

In the embodiment of the invention illustrated in Fig. 2, the ring of electrode segments 28 is dispensed with, and the shaft arm 18, instead of carrying the wiper element 20 in contact with or in capacitive relationship to the face plate 22 of the cathode-ray tube 24, instead carries a permanent magnet 36 which lies in proximity to, but out of contact with, the exterior glass surface of the tube's conical wall section near the junction where such conical portion is joined to the face plate 22. This permanent magnet 36 creates a field of force which extends for a short distance within the glass wall of the cathode-ray tube at the point on the periphery thereof where the magnet is at any moment located. This point therefore represents the instantaneous angular position of shaft 10 in the same manner as in the case of the wiper contact 20 described in Fig. 1.

Within the evacuated envelope of the cathode-ray tube 24 is a radially-extending needle-shaped electrode 38 which is pivoted for rotation about a pin 40 lying on the axis 26 of the tube. Electrode 38 carries a short sleeve 42 of magnetic material on the outer extremity thereof, this magnetic sleeve lying within the field of force created by the permanent magnet 36 when the arm 18 and electrode 38 have the same angular relationship about the tube axis (or in other words, when these two elements are in the respective positions illustrated in the drawing).

The magnetic attraction between the elements 36 and 42 acts to maintain this angular coincidence between arm 18 and electrode 38 as the magnet 36 changes its position upon a rotation of shaft 10, or, in other words, the magnetic sleeve 42 follows the magnet 36 as the latter moves. Expressed still differently, the angular position of electrode 38 is representative of shaft position in the same manner as is the angular position of arm 18.

The pin or shaft 40, of electrically-conductive material, is supported at one end in an opening formed in the inner surface of face plate 22, and at the other end in an opening formed in a glass bead 43 carried on the tip of a stationary reference electrode 32. The glass bead 43 lies on the tube axis 26, so that pin 40 is essentially colinear not only with the tube axis but also with the axis 16 of shaft 10. As in the case of Fig. 1, the electrode 32 is fixed in position, with a lead therefrom extended through the glass side wall of the cathode-ray tube as illustrated.

In the embodiment of Fig. 2, each time the circularly-scanning cathode-ray beam 30 impinges either the movable radial electrode 38 or the fixed radial electrode 32, an output pulse is produced. Pulses from the latter source, as above brought out, act as reference markers, while pulses from electrode 38 yield information respecting angular shaft position.

To couple out the data pulses in the device of Fig. 2, the conductive pin or shaft 40 forms the inner electrode of a coaxial capacitor 44 the outer electrode, or sleeve, of which is suspended in spaced-apart relation from the inner electrode (the pin 40) by a further stationary needle-shaped supporting conductor 46 which extends through the tube wall and is positioned thereby in a manner similar to that of electrode 32.

When the electron scanning beam 30 impinges the movable electrode 38, energy is conducted through shaft 40 to the output conductor 46 by virtue of the capacitive coupling therebetween at 44. The time displacement between this pulse and the pulse produced when the scanning beam 30 impinges fixed electrode 32 is representative of the instantaneous angular position of shaft 10 as was the case in Fig. 1.

To preclude electrons in the scanning beam 30 from directly striking the output conductor 46, the latter is positioned behind the electrode 32, or, in other words, in the shadow of such electrode as seen by the beam. It may, in some instances, be advisable to slightly increase the thickness, or cross-sectional diameter, of electrode 32 so that the scanning beam electrons cannot "bend" therearound to strike conductor 46 and thus have a deleterious effect on the sharpness of the output data pulse, or on the ease of measuring the time displacement between each such data pulse and those pulses from electrode 32 which are indicative of zero shaft position.

Obviously many modifications and variations of the present invention are possible in the light of the above teachings. It is therefore to be understood that within the scope of the appended claims the invention may be practiced otherwise than as specifically described.

I claim:

1. Apparatus for determining the instantaneous angular position of a member rotatable about an axis, said apparatus comprising: a cathode-ray tube positioned coaxially with said rotatable member; a ring-shaped commutator electrode in the form of a plurality of electrically-conductive segments embedded in the face of said cathode-ray tube, each of said segments being electrically insulated from the remaining segments, with each segment extending through the wall of said tube so as to possess both inner and outer conductive surfaces, said ring-shaped commutator electrode being symmetrical about the tube axis; means for developing a beam of electrons within said cathode-ray tube; means for circularly deflecting said developed electron beam so as to scan the inner surface of said ring-shaped commutator electrode and thus successively impinge the conductive segments of which said electrode is composed; a further electrode rigidly secured to said rotatable member and electrically coupled at any instant of time to the outer surface of only one of said conductive segments, the particular segment so coupled being dependent upon the rotational status of said member; means for developing a reference pulse at the same point in each circular scan of said cathode-ray beam; means for developing a data pulse each time that said circularly-scanning cathode-ray beam impinges that particular one of said conductive commutator segments which is coupled to the electrode secured to said rotatable member; and means for measuring the time displacement between said reference pulse and said data pulse during each scanning cycle of the cathode-ray beam to determine the instantaneous angular position of said rotatable member.

2. Apparatus for determining the instantaneous angular position of a member rotatable about an axis, said apparatus including a plurality of electrode elements arranged to be successively impinged by a cyclically-scanning electron beam; means for connecting only one of said electrode elements to an output circuit at any one instant of time, the particular one of said electrode elements so connected being determined by the instantaneous angular position of said rotatable member, whereby a signal is produced in said output circuit during each scanning cycle upon the impingement of said particular electrode element by said beam, means for developing a reference indication at the same point in each scanning cycle of said electron beam, and means for measuring the time displacement between each such reference indication and the signal produced by impingement of said beam upon said particular electrode element to yield information respecting the instantaneous angular position of said rotatable member.

3. Apparatus in accordance with claim 2 in which said means in connecting only one of said electrode elements to an output circuit includes a movable contact carried by said rotatable member and designed to selectively engage that particular one of said electrode elements which is representative of the instantaneous angular position of said member.

4. Apparatus for determining the instantaneous angular position of a member rotatable about an axis, said apparatus comprising: a cathode-ray tube positioned coaxially with said rotatable member; means within said cathode-ray tube for developing a beam of electrons; means for deflecting said beam of electrons so as to produce a circular scan on the face of said cathode-ray tube; a needle-shaped electrode within said tube mounted for free rotation about the axis thereof adjacent said face, said electrode carrying magnetic material on the tip thereof near the periphery of said face; a permanent magnet carried by said rotatable member so that such magnet lies exterior of said cathode-ray tube but adjacent said face and rotates about the outer periphery thereof upon a rotation of said member, the magnetic material carried by said needle-shaped electrode on the tip thereof lying within the magnetic field surrounding said magnet when both said magnet and said electrode have the same angular relationship with respect to the axis of said cathode-ray tube, whereby a change in angular position of said magnet causes said needle-shaped electrode to correspondingly change its angular position due to the magnetic attraction therebetween; and means for developing an output data pulse from said cathode-ray tube when said circularly-deflected cathode-ray beam impinges said needle-shaped electrode during each scanning cycle.

5. Apparatus according to claim 4, further including a fixed radial reference electrode positioned within said cathode-ray tube and adjacent the face thereof, and means for developing an output reference pulse from said fixed radial electrode during each scanning cycle of the circularly-deflected cathode-ray beam.

6. Apparatus according to claim 5 in which said freely-rotatable needle-shaped electrode is mounted on a conductive shaft lying on the cathode-ray tube axis, said shaft being insulatingly pivoted at one of its ends to said fixed radial electrode, and in which said means for developing an output data pulse from said cathode-ray tube when said circularly-deflected cathode-ray beam impinges said needle-shaped electrode includes a radial output conductor fixed in position within said cathode-ray tube and capacitatively coupled to said shaft, said radial conductor lying in the electron shadow of said fixed radial reference electrode so as not to be impinged by electrons in said cathode-ray beam during each circular deflection thereof.

References Cited in the file of this patent

UNITED STATES PATENTS 2,680,241     Gridley  ---------------- June 1, 1954